United States Patent [19]

Nakacho et al.

[11] Patent Number: 4,840,856

[45] Date of Patent: Jun. 20, 1989

[54] ALLYL GROUP-CONTAINING OLIGOETHYLENEOXYPOLYPHOSPHAZENES, PROCESS FOR THEIR PREPARATION, AND THEIR USE

[75] Inventors: Yoshifumi Nakacho; Yuji Tada; Sinichi Yamada, all of Tokushima, Japan

[73] Assignee: Otsuka Kagaku Kabushiki Kaisha, Osaka, Japan

[21] Appl. No.: 245,440

[22] PCT Filed: Dec. 24, 1987

[86] PCT No.: PCT/JP87/01028

§ 371 Date: Aug. 24, 1988

§ 102(e) Date: Aug. 24, 1988

[87] PCT Pub. No.: WO88/05064

PCT Pub. Date: Jul. 14, 1988

[30] Foreign Application Priority Data

Dec. 26, 1986 [JP] Japan ................. 61-310739

[51] Int. Cl.$^4$ ............................................. H01M 6/18
[52] U.S. Cl. .................................... 429/192; 429/218
[58] Field of Search ............... 429/192, 191, 218, 213; 252/62.2

[56] References Cited

U.S. PATENT DOCUMENTS 4,556,614 12/1985 Mehaute et al. ................. 429/191
4,675,260 6/1987 Sakurai ............................ 429/191

FOREIGN PATENT DOCUMENTS 2442513 7/1980 France .

Primary Examiner—Anthony Skapars
Attorney, Agent, or Firm—Armstrong, Nikaido, Marmelstein, Kubovcik & Murray

[57] ABSTRACT

Polyphosphazenes which can be formed into a membrane having a high affinity for a separated substance and an excellent flexibility and even a thin membrane having a high strength and an excellent permeability, a process for their preparation, and their use. The phosphazenes contain allyl groups and have the structure wherein segments represented by the formulae (I), (II) and (III) are arbitrarily arranged. In said formulae, R represents a single group or a mixture of methyl, ethyl, and propyl groups, h and k each represent an average repeating number of ethyleneoxy units, with $0 \leq h \leq 15$ and $0 \leq k \leq 15$, l, m, and n each represent 0 or a positive integer satisfying the condition of $3 \leq l+m+n \leq 200000$ and $n \neq 0$.

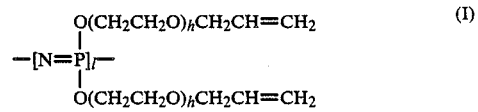

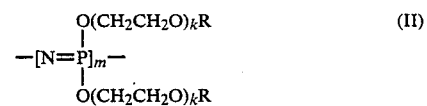

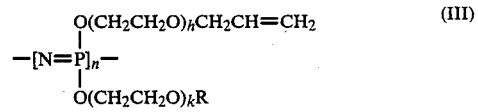

3 Claims, 7 Drawing Sheets

ALLYL GROUP-CONTAINING OLIGOETHYLENEOXYPOLYPHOSPHAZENES, PROCESS FOR THEIR PREPARATION, AND THEIR USE

TECHNICAL FIELD

The present invention relates to novel polyphosphazenes, and more particularly to oligoethyleneoxy polyphosphazenes having an allyl group at the terminal end of its side chain, a process for preparing the same and the use thereof.

BACKGROUND ART

A predominant portion of the energy consumed by the chemical industry which assumes the principal role in producing substances is used not for chemical reactions but for the separation or purification of products, especially for handling aqueous solutions which are great in specific heat and require great energy for heating or cooling. For industries wherein improved productivities and savings in energy are of the greatest importance, what matters is how to conduct efficient separation or purification. Attention has been directed to the use of membranes as useful means for carrying out efficient separation or purification almost without necessitating heating or cooling. It has been desired to develop membranes having various characteristics for use in novel processes, while it is an important problem to provide membranes of improved characteristics for use in existing processes.

Efforts to develop membrane materials are directed to the investigation of materials which can be made into a membrane structure having a uniform distribution of pores suited to the contemplated purpose and also materials which can be made into a thin membrane retaining the desired strength to achieve a high permeability. However, it is difficult to prepare membranes which are uniform in pore size distribution.

The separation or purification of substances is achieved essentially by the selective migration of the substance, and the efficiency of the membrane process is dependent on the ease with which the substance ingresses into and egresses from the membrane and moves through the membrane, so that the affinity of the membrane for the substance to be separated off, the migration of the substance into the membrane and the diffusibility thereof through the membrane are important factors. The ideal condition for the affinity and the migration of the substance into the membrane is the compatibility between the substance and the membrane material, permitting each to dissolve in the other. Further to assure satisfactory diffusibility, the molecules must retain flexibility even at low temperatures, while permitting the membrane to retain its shape at all times. Thus, it is required for developing membranes to search for a material which can be made into a membrane structure having a uniform distribution of pores suited to the intended purpose and also for a material which can be made into a thin membrane of desired strength to achieve a high permeability.

Since the 1960's intensive research has been carried out on polyphosphazenes by H. R. Allcock et al. For example, Inorganic Chemistry, Vol. 5, No. 10, p. 1709 (1966), etc. disclose that such a compound can be prepared by subjecting hexachlorotriphosphonitrile to ring-opening polymerization and to alkoxylation as represented by the following scheme, while it is also known that similar reactions can be carried out using amines.

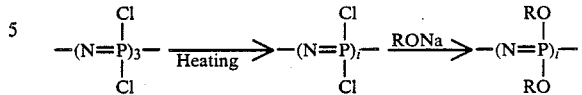

Many polyphosphazene compounds have been synthesized by these methods. We have directed attention to the flexible characteristics of the phosphazene skeleton represented by many items of data accumulated as to the properties and conceived utilization of the characteristics.

On the other hand, secondary batteries presently in wide use include lead batteries and nickel-cadmium batteries wherein the single-cell voltage is about 2 V, and an aqueous solution is used. In recent years, efforts are made in investigate and develop secondary batteries of high energy density which give a high single-cell voltage of at least 3 V and include a negative electrode of lithium. However, when lithium is used which reacts with water or the like, aprotic electrolytes must be used since aqueous electrolytes are not usable. Although polar organic solvents are presently in wide use, a majority of these solvents have a low boiling point (high vapor pressure) are inflammable and therefore involve the likelihood of staining neighboring members and ignition or firing due to a leak or break and the hazard of explosion due to erroneous use or overcharging. Furthermore, repeated discharge and charge of the secondary battery as contemplated form dendrite on the negative electrode, entailing the problem of reduced discharge-charge efficiency and short-circuiting between the positive and negative electrodes. Accordingly, many reports are made on the development of techniques for improving the discharge-charge efficiency of the negative electrode and the cycle life by inhibiting dendrite. Proposed in these reports are, for example, use of a methylated cyclic ether solvent as the solvent for battery electrolytes (K. H. Abraham et al. in "Lithium Batteries," J. P. Gabano, editor, Academic Press, London (1983)), a method of forming an ionically conductive protective film at the Li interface by adding polyethylene glycol, polypropylene glycol, polyethylene oxide or like additive to an electrolyte system (Journal of Power Sources, Vol 12, No. 2, pp. 83-144 (1984) and Unexamined Japanese Patent Publication No. SHO 60-41773), a method of inhibiting Li dendrite by allowing an electrode per se with Al (Unexamined Japanese Patent Publication No. SHO 59-108281).

On the other hand, M. Armand and N. Duclot disclose a novel secondary battery of high energy density incorporating a thin-film polymer electrolyte in Laid-Open French Patent Publication No. 2442512 and European Patent No. 13199. Yao et al. (J. Inorg. Nucl. Chem., 1967, 29, 2453) and Farrington et al. (Science, 1979, 204, 1371) generally describe inorganic ionically conductive solids. Much attention has been directed to these solids from the viewpoint of basic research and because of their use as electrolytes for batteries of high energy density and for sensors. Sequlir et al. (Extended Abstracts, 163rd Meeting Electrochemical Society, 1983, 83, 751, Abstract, No. 493) describe a battery of novel design including a solvent-free thin-film polymer electrolyte, stating that the electrolyte is usable at a medium temperature of about 100° C. as determined by testing.

P. M. Blonsky et al. (J. Am. Chem. Soc., 106, 6854, 1984) state that polyphosphazene (MEEP) is useful as an electrolyte for electrochemical batteries. However, they merely disclose data as to a.c. conductivity in the range of from 30° C. to 97° C. and have not effected discharge and charge with d.c.

As described above, in developing high-performance secondary batteries as heretofore attempted, it is critical to avoid the formation of dendrite, leakage, ignition, firing, explosion and like hazards. It has been desired to complete a secondary battery which has a single-cell voltage of at least 3 V, is assured of safety against these hazards and is operable at the usual ambient temperature.

An object of the present invention is to provide a material which can be made into a membrane having high affinity for the substance to be separated off, excellent flexibility, desired strength despite its small thickness and high permeability.

Another object of the invention is to provide a high-performance secondary battery which is substantially free of formation of dendrite and leakage, has no ignitability due to the features of its frame retardancy and low vapor pressure and is assured of high safety against explosion or the like.

DISCLOSURE OF THE INVENTION

First, the present invention provides an oligoethylenoxy polyphosphazene having allyl and including segments of the following formulae (I), (II) and (III) in a desired arrangement, and a process for preparing the same.

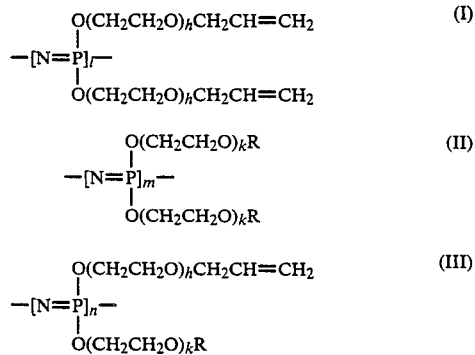

wherein R is one or a mixture of methyl, ethyl and propyl, h and k each mean an average number of repetitions of the ethylene oxide unit and are a real number in the respective ranges of $0 \leq h \leq 15$ and $0 \leq h \leq 5$, l, m and n are each an integer in the range of $3 \leq l+m+n \leq 200000$, and n is not 0.

According to the invention, the oligoethyleneoxy group forms a polyether skeleton, is soft and soluble in water and has ability to dissolve some kinds of salts, so that a membrane forming material having high affinity, flexibility and a satisfactory diffusing property can be obtained by an ingenious combination of such groups. Furthermore, a crosslinking group, when introduced into the terminal end of the side chain, makes the terminal end crosslinkable, whereby the membrane to be obtained can be made to retain its shape without being washed away with water and without losing the characteristics of its skeleton and side chain.

The present invention is characterized in that the invention provides a novel substance which comprises a polyphosphazene skeleton having oligoethyleneoxy groups and allyl groups and further in that the novel substance is crosslinked and made into a membrane which can be retained in conflicting states, i.e. in dissolved state and in the form of the membrane.

The novel compound of the present invention is a polymer which comprises a desired arrangement of segments represented by the formulae (I), (II) and (III) and in which an inorganic high-polymer skeleton in the form of a phosphonitrile main chain is provided with side chains having an allyl group. The compound has high wettability, permits efficient diffusion and migration of substances therethrough, and is very useful as a material for liquid or gas separating membranes and highly valuable to use industrially.

The novel compound of the present invention can be prepared by reacting dichlorophosphonitrile polymer, obtained by subjecting hexachlorotriphosphonitrile to ring-opening polymerization, with specified amounts of alkali metal alcoholates of oligoethylene glycol monoalkyl ether and oligoethylene glycol monoallyl ether which are prepared in advance. This reaction can be carried out by mixing the reactants together at a temperature of up to about 40° C. with use of a usual organic solvent such as tetrahydrofuran (THF) or diglyme, and refluxing the mixture continuously for several hours with heating. Examples of suitable alkali metal are sodium, lithium and the like.

The present invention further provides an alkali metal secondary battery which comprises a positive electrode in the form of a layer of $V_2O_5$, a negative electrode made of a substance capable of occluding an alkali metal ion and releasing the ion, and an electrolyte comprising a complex of oligoethyleneoxy polyphosphazene with an alkali metal salt, the polyphosphazene having allyl and including segments of the formulae (I), (II) and (III) in a desired arrangement.

The battery of of the invention is a novel entirely solid alkali metal secondary battery which is free from any solvent and usable over the temperature range of from a temperature below the freezing point of water to a temperature above the boiling point thereof. The electrolyte of the present battery can be one prepared by adding a solution of an alkali salt in a solvent to a solution of the polyphosphazene of the invention in a solvent to obtain a uniform solution, and making the solution into a member. In accordance with the contemplated use, the solution to be made into the membrane or the membrane formed may be treated, for example, by heating, ultrasonic irradiation or ultraviolet irradiation to form a complex. Examples of useful solvents are ethers such as tetrahydrofuran (THF), dioxane and dimethoxyethane, ketones such as acetone and methyl ethyl ketone (MEK), alcohols such as methanol and ethanol, acetonitrile, propylene carbonate and the like.

The allyl groups present in the present polymer appear to act effectively for the complex forming treatment. Although a detailed explanation still remains to be made, it appears that the coupling between the allyl groups and the reaction or interaction between the allyl and the salt added give a favorable structure to the electrode for use in the battery and enable the electrode to retain this structure.

Examples of alkali metal salts useful for the present invention are those composed of the alkali metal cation, such as $Li^+$ or $Na^+$, to be occluded by the negative electrode, an anion, such as $CF_3SO_3^-$, $SCN^-$, $I_3^-$, $NO_3^-$, $ClO_4^-$, $BF_4^-$, $I_5^-$, $NO_2^-$, $Br^-$, $I^-$, $PF_6^-$, $AsF_6^-$, $FSO_3^-$, $HSO_3^-$, $CF_3COO^-$, $Co(CN)_6^{3-}$, $Fe(CN)_6^{3-}$ or $SO_3^-$, or a mixture of these anions.

The layer of $V_2O_5$ to be used in the invention is obtained by quenching molten $V_2O_5$ to prepare amorphous $V_2O_5$, dissolving the $V_2O_5$ in water and drying the aqueous solution. According to the contemplated purpose, it can be prepared via a fine powder obtained by spray drying or in the form of a thin film obtained by spin coating, or by various other methods. A film having a thickness of not smaller than a submicron can be prepared easily as desired by coating on an electrically conductive substrate and drying. Amorphous $V_2O_5$ starts crystallization at room temperature in several months or at 150° C. in 5.5 hours (Yamazaki et al., Nippon Kagaku Kaishi No. 4, 734 (1987), whereas $V_2O_5$ in the form of a layer stably retains its layer structure at a temperature of up to 200° C. and therefore has the advantage of being stably usable at a temperature of up to the melting point of metallic lithium. When crystalline $V_2O_5$ is used for the positive electrode, the battery has a reduced capacity and is not dischargeable and chargeable satisfactorily (see J. Electochem. Soc. Meeting, Toronto, May 11–16, 1975, No. 27), so that in the case where amorphous $V_2O_5$ is used for the positive electrode, the battery apparently deteriorates during storage.

On the other hand, examples of substances capable of occluding and releasing alkali ions for use as the negative electrodes are alkali metals such as Li, Na and K, alkali alloys such as LiAl, LiHg, LiPb, LiSn, NaHg, KHg and Wood's alloys, complexes of a carbon compound such as polyacetylene or graphite with an alkali metal.

FIG. 1 shows an example of battery fabricated from the foregoing materials. Although in the form of a sheet-type thin-membrane cell battery, the battery is not limited to this form. The battery can be prepared by a very simple method. For example, it is prepared by coating a specified stainless steel panel with an aqueous solution of amorphous $V_2O_5$, drying the coating for removing the water, coating the resulting coating with a solution of the polymer electrolyte prepared in advance, removing the solvent from the coating to form a membrane thereon, superposing on the panel a lithium-coated stainless panel prepared separately in an inert gas atmosphere, and sealing off the resulting assembly in a vacuum using a sealing material.

BEST MODE OF CARRYING OUT THE INVENTION

The invention will be described below with reference to examples. When the substance to be treated is a salt, the wettability and diffusion and migration characteristics of the membrane material can be evaluated in terms of the solubility and ionic conductivity of the salt.

Example 1

Hexachlorotriphosphonitrile was placed into a polymerization tube, which was then connected to a vacuum line. After melting the compound by heating, solidifying the compound by cooling and deaerating the tube repeatedly several times, the tube was sealed off at a reduced pressure, and the compound was polymerized at 250° C. for about 8 hours. The unreacted hexachlorotriphosphonitrile was removed by sublimation in a vacuum at about 70° C. over a period of about 7 hours to give dichlorophosphonitrile polymer resembling a white rubber.

The dichlorophosphonitrile polymer (20.3 unit mmoles, 2.35 g) was dissolved in about 100 ml of dioxane. An alcoholate prepared in advance from 6.4 mmoles of ethylene glycol monoallyl ether and 5.1 mmoles of sodium hydride in about 5 ml of THF was added dropwise to the solution at about 30° C. over a period of about 1 minute, and the mixture was stirred for about 20 minutes.

An alcoholate separately prepared from 80 mmoles of ethylene glycol monomethyl ether and 60.9 mmoles of sodium hydride in about 50 ml of THF was then added dropwise to the mixture at about 30° C. over a period of about 2 minutes. The resulting mixture was refluxed for 12 hours and thereafter concentrated, followed by addition of water, neutralization with dilute hydrochloric acid, dialysis and concentration again, giving 3.04 g of a polymer resembling a brown rubber.

Figure 2:
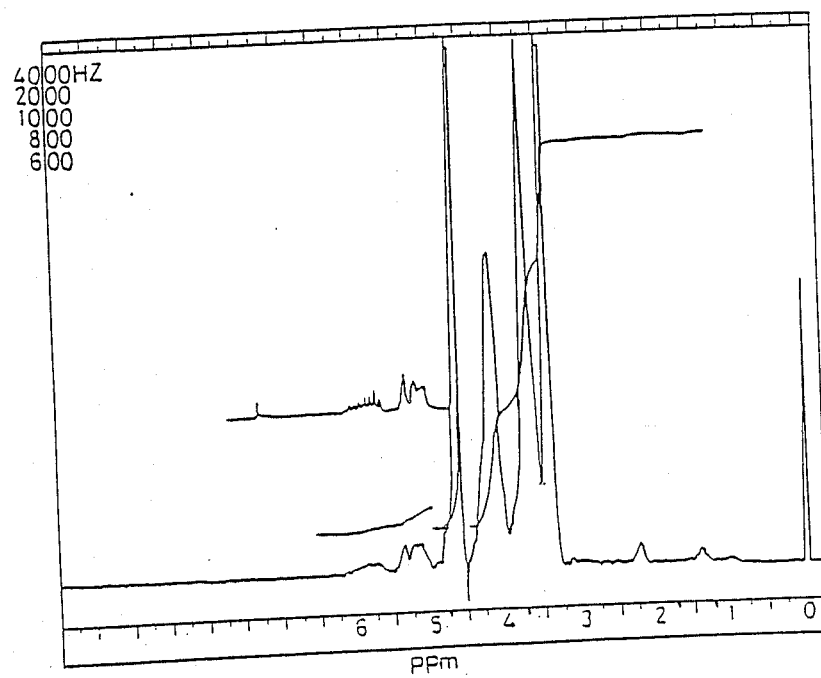
FIGS. 2 to 4 are NMR charts of polyphosphazenes obtained in some examples.

The polymer was analyzed with the following results. $^{31}P$—NMR revealed absorption at $-11.1$ ppm (relative to phosphoric acid) due to polyphosphonitrile, IR revealed absorption at 3075 cm$^{-1}$ (C—H), and 1220 to 1350 cm$^{-1}$ (P=N) due to a substituent and main chain, and the active chlorine concentration was 0.816%. These results and the integrated value of $^1H$—NMR (FIG. 2) indicated the following structure.

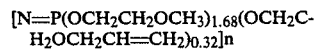

[N=P(OCH$_2$CH$_2$OCH$_3$)$_{1.68}$(OCH$_2$C-H$_2$OCH$_2$CH=CH$_2$)$_{0.32}$]$_n$

Example 2

Oligoethylene glycol monomethyl ether (60.3 mmoles) of the formula HO(CH$_2$CH$_2$O)kCH$_3$ wherein the average k value was about 7 and 8.6 mmoles of oligoethylene glycol monoallyl ether of the formula HO(CH$_2$CH$_2$O)hCH$_2$CH=CH$_2$ wherein the average h value was about 7 were dissolved in about 500 ml of THF. To the solution was added dropwise a hexane solution of 62.6 mmoles of n-butyl lithium at $-23°$ to −13° C. for about 5 minutes. On the other hand, hexachlorotriphosphonitrile was placed into a polymerization tube, which was then connected to a vacuum line. After melting the compound by heating, solidifying the compound by cooling and deaerating the tube repeatedly several times, the tube was sealed off at a reduced pressure, and the compound was polymerized at 250° C. for about 8 hours. The unreacted hexachlorotriphosphonitrile was removed by sublimation in a vacuum at about 70° C. over a period of about 7 hours to give dichlorophosphonitrile polymer resembling a white rubber.

The dichlorophosphonitrile polymer (20.9 unit mmoles, 2.42 g) was dissolved in about 100 ml of dioxane, and the solution was added dropwise to lithium alcoholate prepared in advance, at −40° to −22.5° C. over a period of about 6 minutes. Subsequently, the mixture was refluxed for 7 hours and concentrated, followed by addition of water, neutralization with dilute hydrochloric acid, dialysis with a cellophane film and removal of water, giving 9.86 g of a product resembling a yellow rubber.

The polymer was analyzed with the following results. $^{31}$P—NMR revealed absorption at −11.6 ppm (relative to phosphoric acid) due to polyphosphonitrile, IR revealed absorption at 3075 cm$^{-1}$ (C—H) and 1245 to 1320 cm$^{-1}$ (P=N) due to a substituent and main chain, and the active chlorine concentration was up to 0.01%. These results and the integrated value of $^1$H—NMR (FIG. 3) indicated the following structure.

$[N=P\{O(CH_2CH_2O)_7CH_3\}_{1.74}\{O(CH_2CH_2O)_7CH_2CH=CH_2\}_{0.26}]_n$

Further GPC analysis revealed that the polymer was 138900 in weight average molecular weight and 7.96 in the ratio of Mw/Mn (dispersion degree).

Example 3

A polymer (19.1 g) resembling a pale brown rubber was prepared by the same reactions as in Example 1 using 0.858 mole of ethylene glycol monomethyl ether and 0.123 mole of ethylene glycol monoallyl ether which were dissolved in 500 ml of THF, 0.654 gram atom of Na, and 0.204 unit mole of dichlorophosphonitrile polymer dissolved in 300 ml of dioxane.

The product was 0.047% in active chlorine concentration, and the quantitative determination of allyl by $^1$H—NMR and the iodization method revealed the following structure.

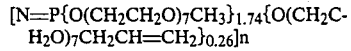
$[N=P(OCH_2CH_2OCH_3)_{1.92}(OCH_2CH_2OCH_2CH=CH_2)_{0.08}]_n$

Example 4

A polymer (68.1 g) resembling a pale brown rubber was prepared by the same reactions as in Example 3 using 1.12 moles of ethylene glycol monomethyl ether and 0.16 mole of ethylene glycol monoallyl ether which were dissolved in 900 ml of THF, 1.07 moles of NaH, and 0.334 unit mole of dichlorophosphonitrile polymer dissolved in 800 ml of dioxane.

The product was 0.10% in active chlorine concentration, and the quantitative determination of allyl by $^1$H—NMR and the iodization method revealed the following construction.

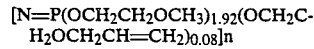
$[N=P(OCH_2CH_2OCH_3)_{1.80}(OCH_2CH_2OCH_2CH=CH_2)_{0.20}]_n$

Example 5

Ethylene glycol monomethyl ether (0.30 mole) and 0.044 mole of oligoethylene glycol monoallyl ether of the formula $HO(CH_2CH_2O)_hCH_2CH=CH_2$ wherein the average h value was about 7 were dissolved in about 400 ml of THF. The same reaction as in Example 2 was conducted for 5 hours using this solution, a hexane solution of 0.29 mole of n-butyl lithium and 0.097 unit mole of dichlorophosphonitrile polymer dissolved in 400 ml of toluene. The product was treated similarly to obtain 18.2 g of the desired polymer.

The product was 0.028% in active chlorine concentration, and the quantitative determination of allyl by $^1$H—NMR and the iodization method revealed the following construction.

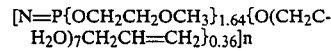
$[N=P\{OCH_2CH_2OCH_3\}_{1.64}\{O(CH_2CH_2O)_7CH_2CH=CH_2\}_{0.36}]_n$

Example 6

Oligoethylene glycol monomethyl ether (375 mmoles) of the formula $HO(CH_2CH_2O)_kCH_3$ wherein the average k value was about 7 and 54 mmoles of oligoethylene glycol monoallyl ether of the formula $HO(CH_2CH_2O)_hCH_2CH=CH_2$ wherein the average h value was about 7 were dissolved in about 500 ml of THF. To the solution was added dropwise a hexane solution of 390 mmoles of n-butyl lithium at −20° to −10° C. for about 30 minutes. On the other hand, hexachlorotriphosphonitrile was placed into a polymerization tube, which was then connected to a vacuum line. After melting the compound by heating, solidifying the compound by cooling and deaerating the tube repeatedly several times, the tube was sealed off at a reduced pressure, and the compound was polymerized at 250° C. for about 8 hours. The unreacted hexachlorotriphosphonitrile was removed by sublimation in a vacuum at about 70° C. over a period of about 7 hours to give dichlorophosphonitrile polymer resembling a white rubber.

The dichlorophosphonitrile polymer (130 unit mmoles, 15.1 g) was dissolved in about 100 ml of dioxane, and the solution was added dropwise to lithium alcoholate prepared in advance, at −15° to −10° C. over a period of about 45 minutes. Subsequently, the mixture was refluxed for 5 hours and concentrated, followed by addition of water, neutralization with dilute hydrochloric acid and dialysis with a cellophane film. A 200-ml portion of the resulting aqueous solution was sampled, and the water was removed therefrom to give 9.67 g of a product resembling a yellow rubber.

Figure 4:
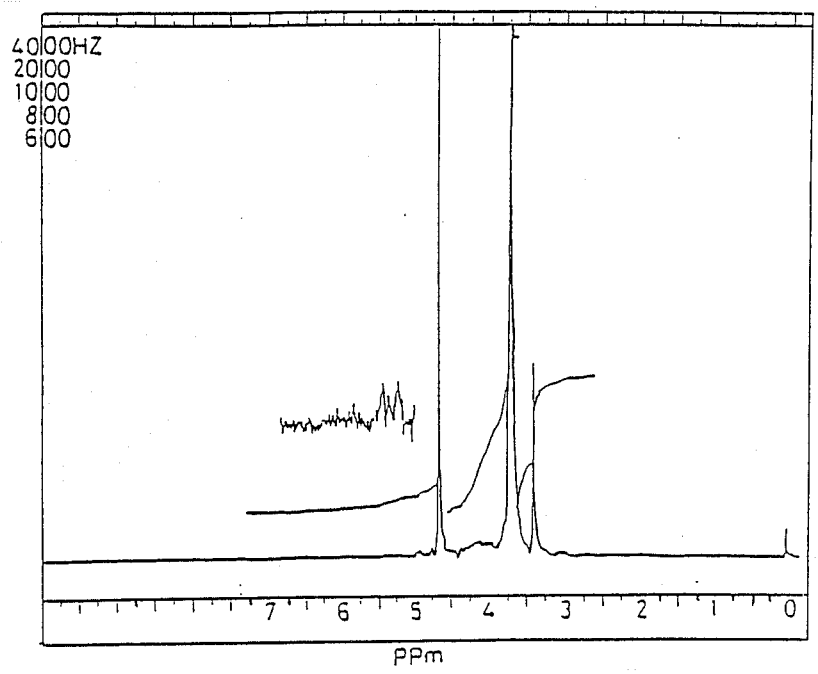

The polymer was analyzed with the following results. $^{31}$P—NMR revealed absorption at −11.6 ppm (relative to phosphoric acid) due to polyphosphonitrile, IR revealed absorption at 3075 cm$^{-1}$ (C—H) and 1245 to 1320 cm$^{-1}$ (P=N) due to a substituent and main chain, the active chlorine concentration was up to 0.015%, and the P content was 4.52%. These results, the integrated value of $^1$H—NMR (FIG. 4) and the quantitative determination of allyl by the iodization method revealed the following structure.

Figure 5:
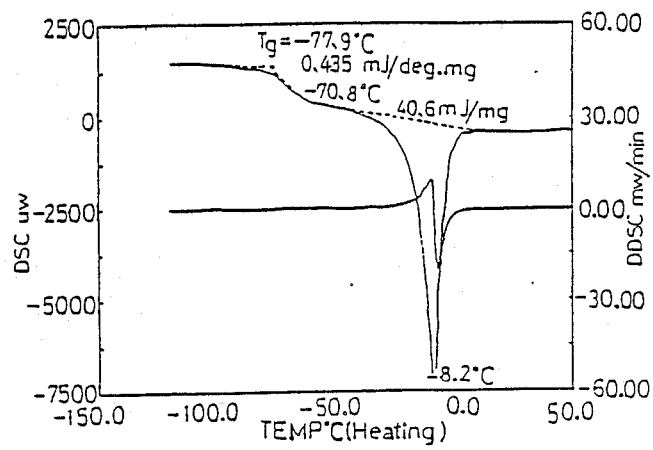
FIGS. 5 and 6 are DSC analysis charts obtained in some examples.

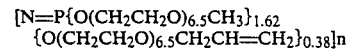
$[N=P\{O(CH_2CH_2O)_{6.5}CH_3\}_{1.62}\{O(CH_2CH_2O)_{6.5}CH_2CH=CH_2\}_{0.38}]_n$ Further GPC analysis indicated that the polymer was 773000 in weight average molecular weight and 23.9 in dispersion degree. FIG. 5 shows the result of DSC analysis, and the Tg value was −77.9° C.

Example 7

Figure 7:
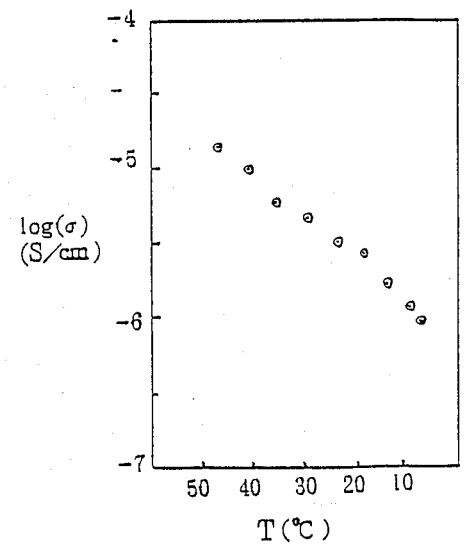
FIG. 7 is a graph showing ionic conductivity.
Figure 6:
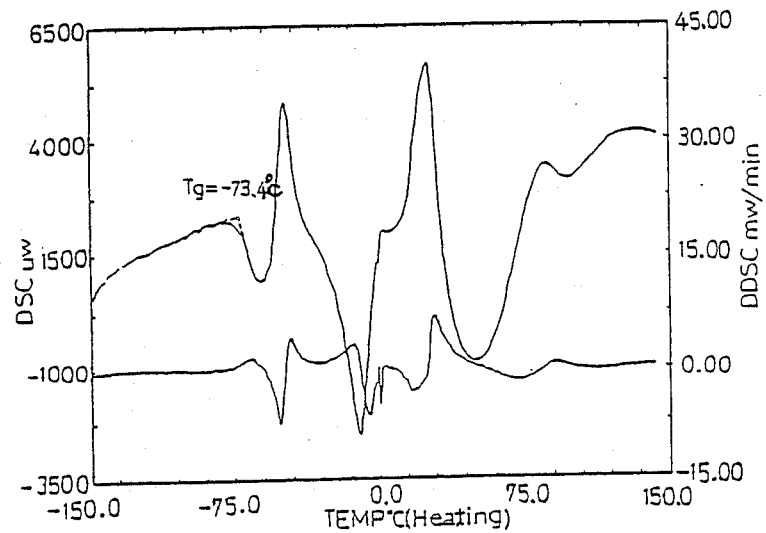

The polymer prepared in Example 6 was dissolved in THF, a glass plate was coated with the solution by casting, and the coating was crosslinked by ultraviolet irradiation to obtain a membrane having a thickness of 0.1 mm. FIG. 6 shows the result of DSC analysis of the membrane. The Tg value (−73.4° C.) indicated that the membrane remained flexible at low temperatures. Similarly, the polymer prepared in Example 6 was dissolved in THF, lithium perchlorate was added to the solution in an amount of 5% based on the polymer, the mixture was made into a membrane by crosslinking in the same manner as above, and the membrane was checked for ionic conductivity. The result was satisfactory as shown in FIG. 7. Further with respect to the solubility of salts, X-ray diffractiometry indicated that the polymer remained in an amorphous state when admixed with 15% of a salt. This reveals that the polymer has satisfactory ability to dissolve salts.

Examples 8 to 23

Polymers were prepared in the same manner as in Examples 1 and 2 with the results given in Table 1.

The values given for $CH_2CH=CH_2$ and $CH_3$ of the product composition represent the values of a and b, respectively, in $NP\{O(CH_2CH_2O)hCH_2CH=CH_2\}_a\{O(CH_2CH_2O)kCH_3\}_b$. The asterisk represents use of NaH for the reaction in place of n—BuLi.

name cards measuring 5.5 cm×9 cm and is about 0.1 mm in thickness.

The battery is prepared, for example, by the following method. First, amorphous $V_2O_5$ obtained as by quenching is made into a 3% aqueous solution, and a stainless steel panel, measuring 5.5 cm×9 cm and 20 μm in thickness, is uniformly coated with the solution over its central portion having an area of 36 (4.5×8) cm². The panel is then dried at 80° to 100° C. for 0.5 to 1 hour to form a coating and then dried in a vacuum at 180° C. for 5 hours to obtain a positive electrode member. The member is then coated with a solution (2.43 g) separately prepared by dissovling 10 g of phosphazene polymer having an average molecular weight of about 260,000 and represented by the formula $$[NP\{O(CH_2CH_2O)_7CH_2CH=CH_2\}_{0.53}\{O(CH_2CH_2O)_7CH_3\}_{1.47}]_n$$

and $LiClO_4$ (1 g) in THF (189 g), followed by ultrasonic treatment at a temperature of up to 40° C. After removing the THF, the resulting coating is subjected to ultraviolet irradiation to form a membrane.

On the other hand, a stainless steel panel, measuring 5.5 cm×9 cm and 20 μm in thickness, is centrally coated with 7.7 mg of lithium by vacuum evaporation in an argon atmosphere over an area of 36 cm², and a sealing material is applied to the peripheral portion of the panel over a width of about 5 mm to prepare a negative electrode member. The two members are affixed to each other, and the assembly is sealed off in a vacuum to complete a battery.

Figure 3:
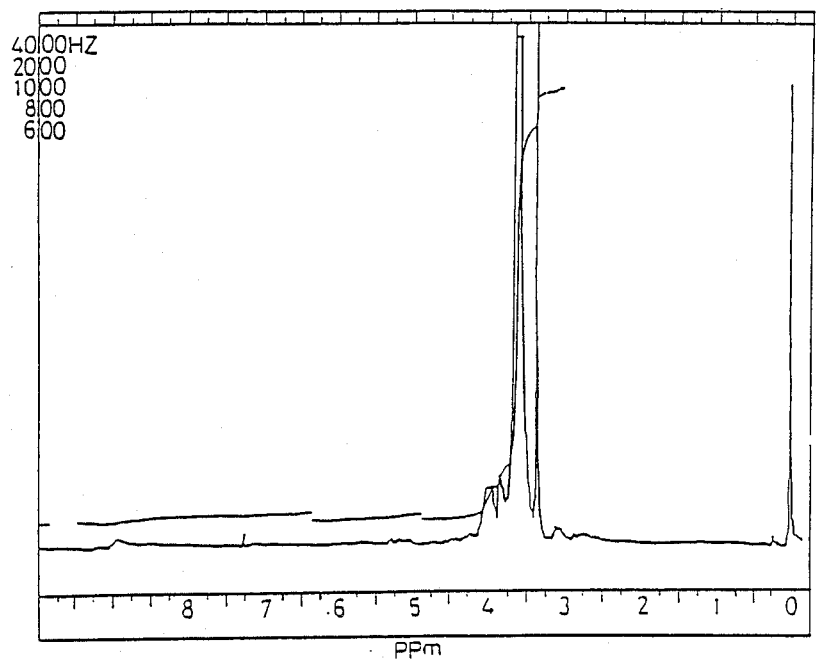

The battery thus fabricated was 3.84 V in open-circuit voltage. FIG. 3 shows the result achieved by the battery when it was discharged at a constant current of 0.5 mA at 30° C. Until the voltage dropped to 2 V, the

TABLE 1

| Ex. | (NPCl₂)n unit n | (NPCl₂)n mole | HO(CH₂CH₂O)h CH₂CH=CH₂ h | HO(CH₂CH₂O)h mole | HO(CH₂CH₂O)kCH₃ k | HO(CH₂CH₂O)kCH₃ mole | n-BuLi mole | Product CH₂CH=CH₂/CH₃ | | Yield (g) | Active chlorine (%) | Molecular weight Mw | Mw/Mn | Tg (°C.) |
|---|---|---|---|---|---|---|---|---|---|---|---|---|---|---|
| 8 | polymer | 0.025 | 7 | 0.0055 | 7 | 0.077 | 0.075 | 0.05 | 1.95 | 14.8 | 0.026 | 247000 | 10.9 | |
| 9 | polymer | 0.099 | 7 | 0.110 | 7 | 0.220 | 0.300 | 0.82 | 1.18 | 68.4 | 0.030 | 323000 | 18.3 | |
| 10 | polymer | 0.066 | 7 | 0.055 | 7 | 0.165 | 0.200 | 0.53 | 1.47 | 42.8 | 0.060 | 256000 | 13.2 | −76.3 |
| 11 | polymer | 0.086 | 7 | 0.026 | 7 | 0.259 | 0.250 | 0.14 | 1.86 | 52.8 | 0.022 | 279000 | 16.1 | −73.7 |
| 12 | 3 | 0.300 | 0 | 0.220 | 0 | 6.25 | *0.80 | 0.78 | 1.22 | 37.0 | 0.025 | | | |
| 13 | polymer | 0.083 | 0 | 0.061 | 0 | 5.00 | 0.305 | 0.07 | 1.93 | 4.1 | 0.041 | 80000 | 3.8 | |
| 14 | polymer | 0.107 | 0 | 0.064 | 2 | 0.420 | 0.372 | 0.28 | 1.72 | 20.0 | 0.023 | 4550 | 1.7 | |
| 15 | polymer | 0.0267 | 0 | 0.010 | 7 | 0.090 | 0.086 | 0.31 | 1.69 | 11.8 | 0.030 | 524000 | 20.7 | |
| 16 | polymer | 0.109 | 1 | 0.065 | 2 | 0.430 | *0.354 | 0.45 | 1.55 | 26.0 | 0.028 | | | |
| 17 | polymer | 0.162 | 1.5 | 0.084 | 2 | 0.630 | *0.56 | 0.34 | 1.66 | 15.3 | 0.051 | | | |
| 18 | polymer | 0.175 | 5 | 0.116 | 3 | 0.462 | 0.525 | 0.37 | 1.63 | 20.6 | 0.044 | 50000 | 4.0 | |
| 19 | polymer | 0.153 | 1 | 0.112 | 7 | 0.337 | 0.408 | 0.52 | 1.48 | 26.6 | 0.044 | 824000 | 104.0 | |
| 20 | polymer | 0.114 | 0 | 0.180 | 0 | 3.000 | *0.320 | 0.32 | 1.68 | 4.3 | 0.011 | 43100 | 4.1 | |
| 21 | polymer | 0.073 | 10 | 0.240 | 0 | 0.054 | 0.274 | 1.20 | 0.80 | 44.0 | 0.020 | 6000 | 2.3 | |
| 22 | polymer | 0.063 | 0 | 0.050 | 22.5 | 0.152 | 0.180 | 0.14 | 1.86 | 40.6 | 0.035 | 108000 | 13.8 | |
| 23 | polymer | 0.042 | 10 | 0.047 | 22.5 | 0.093 | 0.127 | 0.34 | 1.66 | 26.0 | 0.022 | 73000 | 5.9 | |

Example 24

Figure 1:
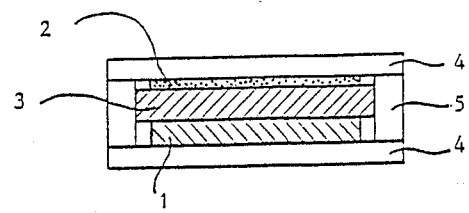
FIG. 1 is a sectional view schematically showing a sheet-type thin-membrane battery embodying the invention and comprising a positive electrode 1 in the form of a 15-μm-thick layer, a negative electrode 2 made of metallic lithium and having a thickness of 4 μm, an electrolyte 3 having a thickness of 40 μm, SUS panels 4 having a thickness of 20 μm and a sealing material 5.
Figure 8:
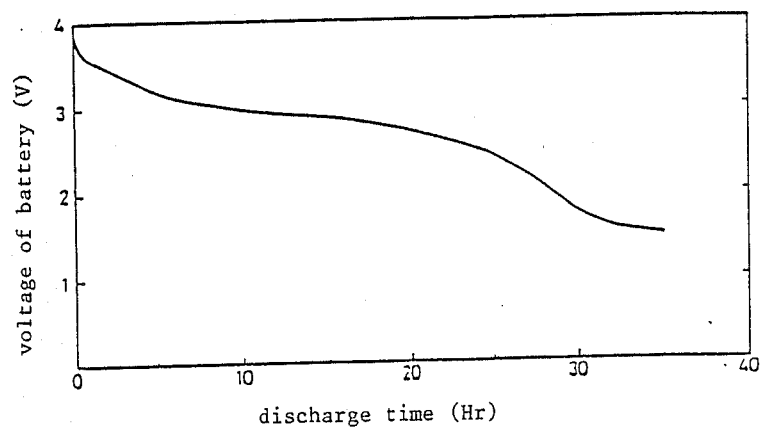
FIG. 8 is a graph showing the result achieved by the battery of Example 24 when it was discharged at a constant current of 0.5 mA at 30° C.
Figure 9:
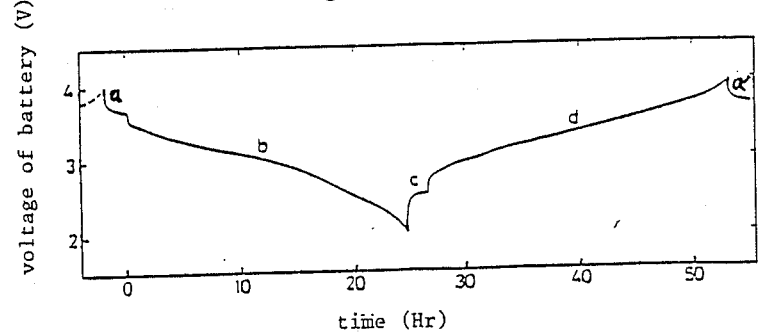
FIG. 9 is a graph showing the result achieved when the same battery was tested for discharge and charge.

FIG. 1 is a sectional view schematically showing a sheet-type thin-membrane battery embodying the present invention. The battery externally has the same size a battery had a discharge capacity density of 105 Ah/kg and an energy density of 289 Wh/kg relative to the positive electrode active substance. Until the voltage dropped to 1.5, the battery has a discharge capacity density and a discharge energy density of 128 Ah/kg and 330 Wh/kg, respectively. The battery was further subjected to a discharge-charge test at 0.5 mA between 4 V and 2 V. FIG. 9 shows the voltage level during the 10th cycle. The curve portions a and a' each represent a repose period after charge, and indicated at b is a discharge state, at c a repose period after discharge, and at d a charge state. The open-circuit voltage after the completion of charge was 3.65 V, and the open-circuit voltage after the completion of discharge was 2.55 V. When starting charge and discharge, the battery exhibited a voltage variation of about 0.1 V due to the internal resistance.

Figure 10:
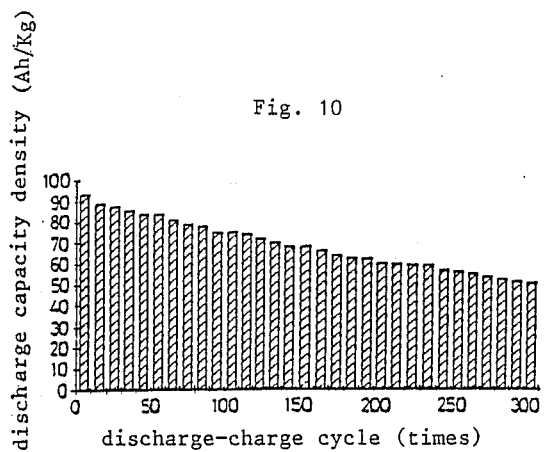
FIG. 10 is a graph showing the discharge capacity density of the same battery during discharge-charge cycles.

With one half of the initial capacity taken as a limit, the discharge-charge cycle life of the battery was at least 300 cycles as illustrated in FIG. 10.

Example 25

A battery prepared in the same manner as in Example 24 was checked for the current density and the discharge capacity which permit discharge and charge, as related to the temperature. Table 2 shows the result.

TABLE 2

| Temp. | Current density | | | | |
|---|---|---|---|---|---|
| | 25 $\mu A/cm^2$ | 20.5 $\mu A/cm^2$ | 10 $\mu A/cm^2$ | 4 $\mu A/cm^2$ | 0.5 $\mu A/cm^2$ |
| 120° C. | 140 | | | | |
| 100° C. | 135 | | | | |
| 60° C. | 120 | | | | |
| 50° C. | 100 | | | | |
| 40° C. | 60 | 75 | | | |
| 30° C. | 40 | 50 | | | |
| 20° C. | | 40 | | | |
| 10° C. | | 30 | 37 | | |
| 0° C. | | | 15 | | |
| −10° C. | | | 2.5 | 7.5 | |
| −20° C. | | | | | 0.4 |

The discharge capacity is listed in Table 2 in Ah/kg, and each value given is the average for about 10 cycles.

The result indicates that the battery is usable as a secondary battery in the range of −20° C. to 120° C.

Example 26

Figure 11:
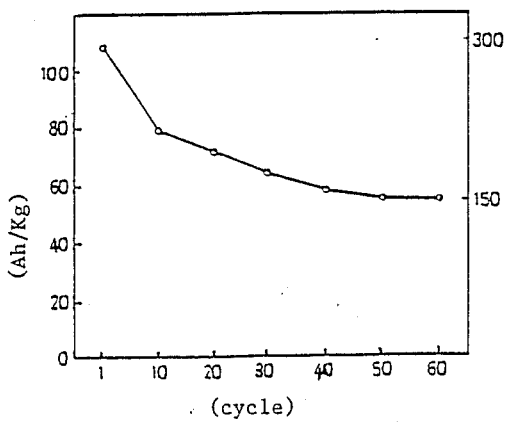
FIG. 11 is a graph showing the discharge capacity density of the battery of Example 26 during discharge-charge cycles.

A battery was prepared in the same manner as in Example 24 using a negative electrode which was obtained by depositing lithium on a 0.3-mm-thick aluminum panel by vacuum evaporation to alloy one surface thereof. When similarly tested, the battery exhibited an open-circuit voltage of 3.35 V, and an initial capacity density of 103 Ah/kg and an initial energy density of 271 Wh/kg until a lower limit potential of 2 V was reached by constant-current discharge-charge at 0.5 mA. This indicates that the electrode was equivalent to the lithium negative electrode in ability. The discharge-charge efficiency was generally 100%. FIG. 11 showing the result of discharge-charge cycle test reveals that the battery was fully capable of serving as a secondary battery.

INDUSTRIAL APPLICATION

The polyphosphazene of the present invention is excellent in wettability and diffusion and migration characteristics and is expected to be very useful as a material for liquid or gas separating membranes. The complex of the present polyphosphazene with an alkali metal salt is useful as an electrolyte for alkali metal secondary batteries.

We claim:

1. An alkali metal secondary battery comprising a positive electrode in the form of a layer of $V_2O_5$, a negative electrode made of a substance capable of occluding and releasing an alkali metal ion, and an electrolyte comprising a complex of the polyphosphazene with an alkali metal salt.

2. A battery as defined in claim 1 wherein metallic lithium or a lithium-aluminum alloy serves as the negative electrode, and a complex of a lithium salt serves as the electrolyte.

3. A thin-membrane battery as defined in claim 1 wherein the positive electrode comprises a thin panel of stainless steel, aluminum or the like having a coating formed thereon by applying an aqueous solution of amorphous $V_2O_5$ to the panel and drying the applied solution.

* * * * *